United States Patent [19]

Joy et al.

[11] Patent Number: 5,043,923

[45] Date of Patent: Aug. 27, 1991

[54] APPARATUS FOR RAPIDLY SWITCHING BETWEEN FRAMES TO BE PRESENTED ON A COMPUTER OUTPUT DISPLAY

[75] Inventors: William Joy, Palo Alto; Serdar Ergene, San Jose; Szu-Cheng Sun, Santa Clara, all of Calif.

[73] Assignee: Sun Microsystems, Inc., Mountain View, Calif.

[21] Appl. No.: 655,226

[22] Filed: Feb. 12, 1991

Related U.S. Application Data

[63] Continuation of Ser. No. 254,957, Oct. 7, 1988, abandoned.

[51] Int. Cl.[5] .............................................. G06F 15/62

[52] U.S. Cl. .................................... 364/522; 340/725

[58] Field of Search ................ 364/521, 522; 340/734, 340/725

[56] References Cited

U.S. PATENT DOCUMENTS

| | | | |
|---|---|---|---|
| 4,550,315 | 10/1985 | Bass et al. | 364/522 X |
| 4,769,762 | 9/1988 | Tsujido | 364/521 |
| 4,823,108 | 4/1989 | Pope | 364/521 X |
| 4,829,454 | 5/1989 | Kurakake et al. | 364/521 |
| 4,852,024 | 7/1989 | Kurakake et al. | 364/521 |
| 4,907,174 | 3/1990 | Priem | 364/521 |

FOREIGN PATENT DOCUMENTS

| | | |
|---|---|---|
| 0149310 A2 | 11/1984 | European Pat. Off. . |
| 0175341 A2 | 9/1985 | European Pat. Off. . |
| 0185294 A2 | 12/1985 | European Pat. Off. . |
| 0197413 A2 | 3/1986 | European Pat. Off. . |
| 2113950 A | 1/1983 | United Kingdom . |
| 2130857 A | 9/1983 | United Kingdom . |
| 2141908 A | 5/1984 | United Kingdom . |
| 2144607 A | 7/1984 | United Kingdom . |
| 2181928 A | 10/1985 | United Kingdom . |
| 2214038 A | 7/1988 | United Kingdom . |

OTHER PUBLICATIONS

Computer Dictionary, Fourth Edition, Charles J. Sippl, 1985, p. 35.

*Primary Examiner*—Gary V. Harkcom
*Assistant Examiner*—Mark K. Zimmerman
*Attorney, Agent, or Firm*—Blakely Sokoloff Taylor & Zafman

[57] ABSTRACT

A computer output system having a first full screen bitmapped memory, a second full screen bitmapped memory, logic circuitry for providing input signals for writing information to be displayed by an output device to each position of the first memory, logic circuitry for storing in the second memory the positions of each position of the first memory to be written to the output device, and logic circuitry for comparing the signal stored at each position of the first memory and the signal stored at the same position of the second memory to determine whether information at the position is to be written to the output device.

26 Claims, 6 Drawing Sheets

INPUT FID REG
FID MEM B
FID MEM A
DISPLAY MEM B
DISPLAY MEM A
MUX
OUTPUT FID REG
COMPARE
BACKGROUND COLOR REG
CONTROL REG
CRT
WRITE ENABLE LOGIC
DISPLAY WRITE A
DISPLAY WRITE B
FID WRITE A
FID WRITE B
HOST DATA BUS
FROM CPU
RGB
A/B
FID ON
if =
if not =
Ø/1/2
10
13
14
15
16
17
18
19
20
21
22
23
24
25

| Z-BUFF COMP. <= OUTPUT | FID COMP OUTPUT = | WRITE ENABLE |
|---|---|---|
| X | Ø | 1 |
| 0 | 1 | Ø |
| 1 | 1 | 1 |

Fig. 4

| WID = | Z-BUFF <= | FID = | WRITE |
|---|---|---|---|
| Ø | X | X | Ø |
| 1 | X | Ø | 1 |
| 1 | Ø | 1 | Ø |
| 1 | 1 | 1 | 1 |

Fig. 6

APPARATUS FOR RAPIDLY SWITCHING BETWEEN FRAMES TO BE PRESENTED ON A COMPUTER OUTPUT DISPLAY

This is a continuation of application Ser. No. 07/254,957 filed Oct. 7, 1988, now abandoned.

BACKGROUND OF THE INVENTION

The present invention relates to logic circuitry and, more particularly, to logic circuitry used to provide extremely rapid switching between output display frames in a computer system.

DISCUSSION OF THE PRIOR ART

As computer systems such as work stations have grown more and more sophisticated, it has become clear that they might be conveniently utilized for providing the animation features that one associates with motion pictures and television. A computer which is capable of providing an animated output offers a distinct advantage over television and motion pictures because it, unlike the others, allows both the construction and revision of the images of animated displays. The abililty of computers to provide three dimensional displays has hastened and heightened the desire for systems which are capable of handling animated subjects.

A major problem in utilizing computers to provide animated output is that animation requires the display of frames which vary by small increments and succeed one another in rapid sequence. In order to display a single frame of graphical material on a cathode ray tube (CRT), it is necessary to store an indication for each position (pixel) which is to appear on the cathode ray tube or other display of the information which is to be displayed at that position. With large and detailed displays, the number of pixels on the cathode ray tube may average approximately 1,000 in a horizontal direction and a like number in the vertical direction giving a total of approximately one million pixels about which information is to be stored. In a preferred system which is capable of providing a number of different colors and hues on the cathode ray tube, each of these pixels contains twenty-four bits of digital information specifying the particular color output. Consequently, approximately twenty-four million bits of information needs to be stored for each frame to be presented at the output.

However, not only does writing the approximately twenty-four million bits to each storage position of a frame to be provided as output to a cathode ray tube require a substantial amount of time, but the clearing of those bits in order to provide the next frame requires an additional amount of time. Some of the delay between frames has been obviated by using double buffered systems in which two full screen pixmapped memories are provided and switched alternately to the cathode ray tube output. Such a system reduces substantially the time between presentation of two frames of information but does not eliminate the need to rapidly clear each of the display memories so that they may be written to for the frames which follow. Consequently, even such double buffered systems are too slow to provide optimum outputs for animation purposes.

It is, therefore, an object of this invention to improve the speed at which images may be switched from frame to frame and presented at the output of a computer system.

It is another object of this invention to eliminate a substantial portion of the delay associated with clearing display memories between frames in a computer system.

It is another object of this invention to eliminate the necessity of clearing display and depth memories between frames in a computer system.

An additional object of this invention is to improve the speed at which computer systems operate.

SUMMARY OF THE PRESENT INVENTION

The present invention improves the speed at which individual frames may be switched to the output of a computer system by essential eliminating the time normally used for clearing the display memories in such a system. The system accomplishes this by providing double-buffered frame identification memory to store indications of the frame stored corresponding to the information in an associated display memory. Each pixel in the display memory has an associated, corresponding pixel in the frame identification memory.

When a frame which has been written into the display memory is to be read out, an output frame identification register provides an indication of the frame to be read out as a frame number, and that frame number is compared with the value of each pixel in the frame identification memory as the frame identification memory and the display memory are scanned for cathode ray tube refresh. Only those pixels in the selected frame are provided as output from the display memory to the cathode ray tube. At pixels at which the number in the output frame identification register and the frame identification memory do not compare, a background color generator is activated to provide information to the cathode ray tube. This allows frame to frame writing to the display memory to continue without erasing the display memory and erasing only a small portion of the frame identification memory.

An additional somewhat similar logic arrangement is provided for determining the depth to which pixels of a particular frame are to be written along the Z-axis so that three dimensional figures may be accurately represented on a two dimensional output display. The invention allows frame-to-frame use of the Z buffer to continue without erasing the Z buffer. Moreover, another similar logic arrangement is provided for determining the window in which pixels of a particular frame are to be written so that windows may be handled in the same system.

These and other features and advantages of the present invention will become apparent to those skilled in the art after having read the following detailed description in conjunction with the several figures of the drawing.

IN THE DRAWINGS

FIG. 4 is a truth table useful in illustrating the operation of the arrangement shown in FIG. 3.

FIG. 6 is a truth table useful in illustrating the operation of the circuitry shown in FIG. 5.

DETAILED DESCRIPTION OF THE INVENTION

Frame Identification

Figure 1:
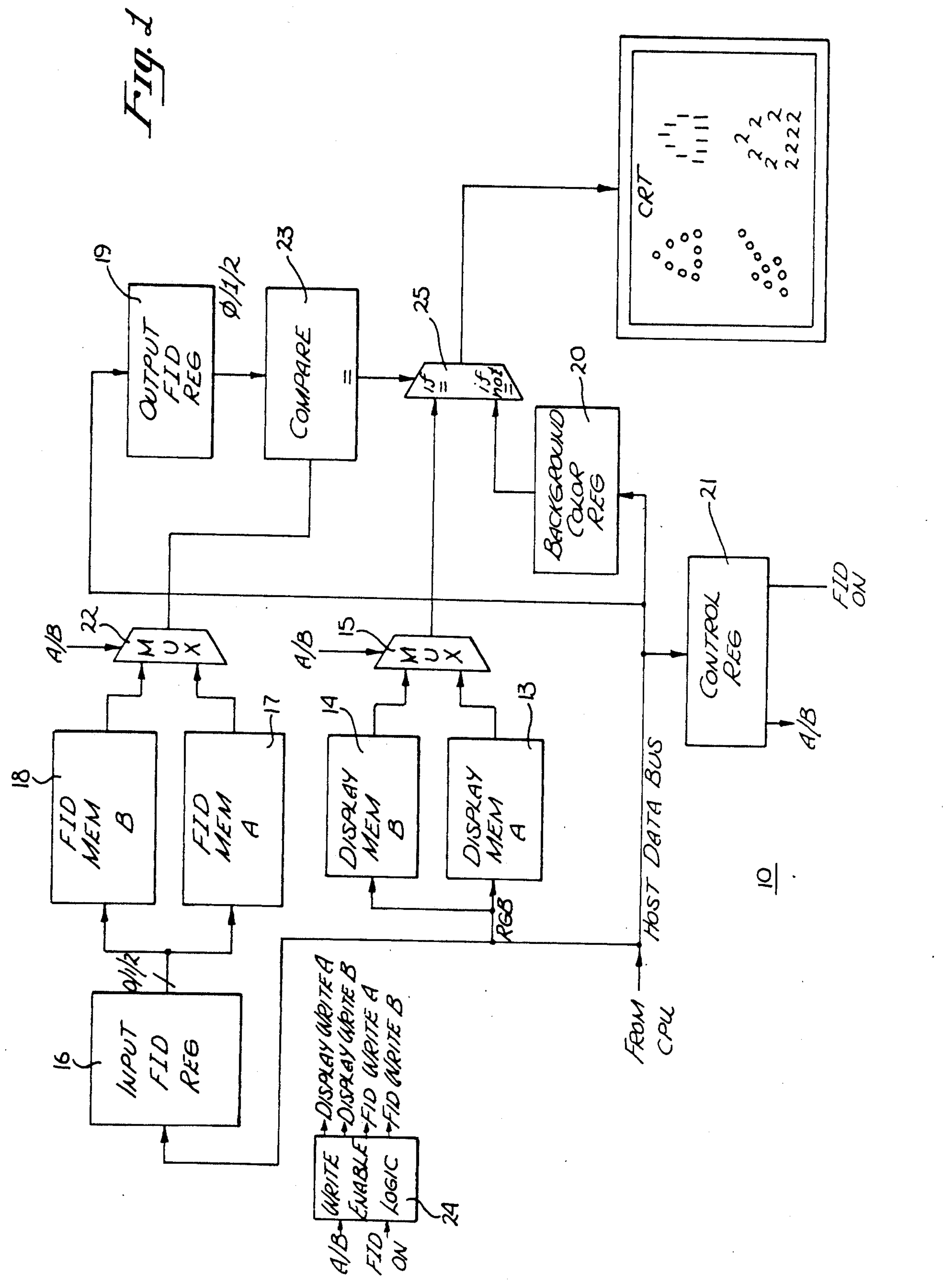
FIG. 1 is a block diagram illustrating a arrangement in accordance with the invention for selecting individual frames to be displayed on a computer output device.

Referring now to FIG. 1, there is shown a display output system 10 for processing information rapidly in accordance with the invention. For the purposes of this explanation, a frame may include a particular graphical or data structure which it is desired to present as a full screen presentation on a cathode ray tube or other computer output device. The system 10 operates under control of a central processing unit (CPU) not shown in FIG. 1.

When it is desired to write a particular graphic frame to an output device such as the cathode ray tube (CRT) 12 shown in FIG. 1, the actual information to be displayed is written to a display memory. The system 10 comprises a first display memory A (13) and a second display memory B (14). The use of two display memories in parallel, the output of which may be selected by a multiplexor 15, allows the rapid switching between the frames of a display which is necessary to accomplish animation. In the usual case, a frame is written to display memory A while the frame in display memory B is being furnished as output to the cathode ray tube. The information in the frame in display memory A is then furnished as output to the cathode ray tube while a new frame is written to display memory B.

In prior art systems, each of the display memories A and B must be cleared before new information can be stored in it. This clearing step, with a display having a significant number of pixels and storing twenty-four bits of information at each pixel as in the preferred embodiment, requires a significant amount of time and may slow the operation of the system to the point where its use in animation is impractical.

To obviate this loss of time and provide the switching speed necessary for animation, the output system 10 of the present invention also includes an input frame identification (FID) register 16, a pair of frame identification (FID) memories A (17) and B (18) each associated with the similarly named one of the display memories A and B, an output frame identification (FID) register 19, a background color register 20, and a control register 21. The system 10 also includes a multiplexor 22, a comparator circuit 23, a write enable logic circuit 24, and a logic circuit 25.

The operation of the system 10 is as follows. The CPU writes a value to the control register 21 using the host data bus to select which of the FID memories A (17) or B (18) and its associated display memory A (13) or B (14) is to be written to.

The CPU then provides a frame identification number which is stored in the input frame identification register 16 used for all of the information to be written for that frame. In a preferred system, sixteen frame numbers (0–15) are utilized. After the input frame identification register has been initialized with the frame number, the actual information to be displayed on the output device is sent from the CPU to the selected display memory A or B. The display memories A and B are each full screen pixmapped memories. The frame identification memories A and B are also full screen pixmapped memories, each receiving input from the input FID register 16 and providing outputs to a multiplexor 22 which allows them to be rapidly switched for the presentation of animated graphic images.

Each piece of input information on the host data bus from the CPU carries a pixel address, and color information (an RGB color value, for example). Presuming that the display memory A and the FID memory A have been selected, the RGB color value is written to the appropriate pixel address in display memory A while the frame identification number is written to the same pixel address in the frame identification memory A. In a preferred system, the frame identification number requires four bits of storage while the RGB color value requires twenty-four bits of storage at each pixel.

Consequently, when any particular full frame has been written to display memory A, the display memory A contains, at the addressed positions chosen for the particular frame, the representation to be displayed in RGB color values. Presuming that a triangle (such as that shown in the upper left corner of CRT 12) is to be stored in the display memory A and written to the cathode ray tube 12 shown in FIG. 1, the color values for that triangle are placed at the appropriate pixels of the display memory A while a triangular indication is stored at the same pixels in the frame identification memory A but as the frame identification number.

For example, if the triangular indication has been stored as frame zero, the color indications are provided in triangular form in the display memory while the numbers zero are stored at the same triangular positions in the associated FID memory. When it is time to display frame zero at the CRT, the CPU, using the host data bus stores the frame identification number, a zero in this case, in the output frame identification register 19 (again a four bit register in the preferred embodiment). The CPU also writes to the control register 21 so that the multiplexors 22 and 15 controlling the outputs of the frame identification memories and the display memories, respectively, are set to select the output from memories A. Then, as each pixel in the display memory A is scanned to the output through its associated multiplexor, frame identification values are also scanned from the frame identification memory A for that particular pixel. The values from the frame identification memory will be zero only at the positions where the triangle is stored. Consequently, a comparator circuit 23 comparing the output from the selected frame identification memory and from the output frame identification register 19 provides a signal indicating those pixels of the frame identification memory A where frame zero has been written (i.e., the triangle having a frame identification number of zero). Therefore, at those positions at which the frame identification memory A stores a zero frame identification number, the comparator circuit provides an equal output indicating a pixel which is part of the current frame; and the RGB color signal stored at that pixel in the display memory A is furnished to the cathode ray tube via logic circuit 25. On the other hand, at all pixels other than those having a frame identification number of zero in the frame identification memory A, the comparator circuit 23 provides a not equal output indicating that the pixel is not a part of the current frame; and a background color is provided from the background color register 20 and transferred to the cathode ray tube 12.

This arrangement for processing signals has a number of significant advantages. For example, the system requires that color values be stored in the display memories only at positions indicative of foreground data. Background colors need not be stored in the display memories. Consequently, storage of information may proceed at a more rapid rate than with the usual system where twenty-four bits of information must be stored at each pixel. More importantly, a display memory need not be erased after the information for a frame is read out in order to write the next frame in that memory.

For example, after frame zero has been processed as explain above, the next frame to be processed by the particular FID memory has the next frame number which is one. The information written to the FID memory and to the associated display memory may, consequently, simply be written on top of the information in those memories because the only information which will ultimately be furnished to the display will be information associated with frame number one, as selected by the FID output register.

It will be appreciated that this arrangement which eliminates the need to clear the display memory significantly speeds the operation of the system and allows the rapid switching necessary for animation.

Although the use of FID memories and registers allows the system to function without clearing the display memories between particular frames, the number of bits utilized in the frame identification number system, four bits in the preferred case, determines how many total frames may be written before the FID memories must be cleared. With four bits of digital storage to record the frame number, sixteen total frames may be utilized. If the FID memories have not been cleared after sixteen frames, then it is possible that information relating to a previous zero frame, for example, will remain in an FID memory as the zero frame is again reached. Since this information might be erroneous, the system does require that the FID memories be cleared at least once in each sixteen uses.

Figure 8:
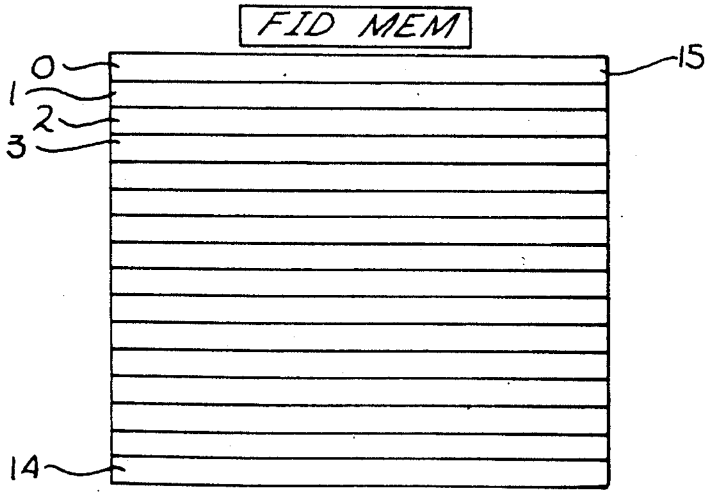
FIG. 8 is a diagram useful in understanding the operation for clearing frame identification memories in accordance with the present invention.

An advantageous way of accomplishing the clearing without slowing the operation of the system to any extent is to clear at least one-fifteenth or greater of an FID memory after each frame is written to the output device. For example, FIG. 8 illustrates the division of an FID memory into fifteen horizontal strips. After the zero frame has been displayed on the CRT, a clear value of "zero" frame number is written to the uppermost horizontal strip of the FID memory; and after the one frame has been displayed, a clear value of "one" frame number is written to the next horizontal strip of the memory. Similar values are applied to each succeeding horizontal strip after each succeeding display of a frame. Consequently, the next time a zero frame is to be written to the FID memory, the memory will be entirely clear of zero values because all horizontal strips below the top strip will have been purged of zero values and the top strip of FID memory, which originally held zero values, will have been filled with values of fifteen, the last FID frame number to have been used. Consequently, no old zero frame signals will be present to distort the information to be stored in the FID memory. The same result will occur as each next frame number is written, the memory will have been cleared of all indications of that frame number just before the new frame is written. Clearing the values from memory is, of course, accomplished in a manner well known to the prior art by means specific to the particular storage elements.

It will be clear to those skilled in the art, that clearing one-fifteenth of the FID memory after each output of a frame to the CRT is significantly faster than the arrangements used by prior art systems which required the clearing of the entire display memory with each output to the CRT. First, the display memory includes twenty-four bits at each pixel, and each must be cleared. On the other hand, the FID memories hold only four bits at each pixel. This alone would make the system six times faster even if the FID memories were to be cleared entirely after each write to the output device. In the preferred embodiment which clears only one-fifteenth of the FID memories, the time required is but one-fifteenth of that to clear the full FID memory. Consequently, the total time utilized for clearing in the present system is approximately one ninetieth of that required in prior art systems having equivalent display memories. This advantage can be easily increased if using FID memories with more bits.

WINDOW IDENTIFICATION

Figure 2:
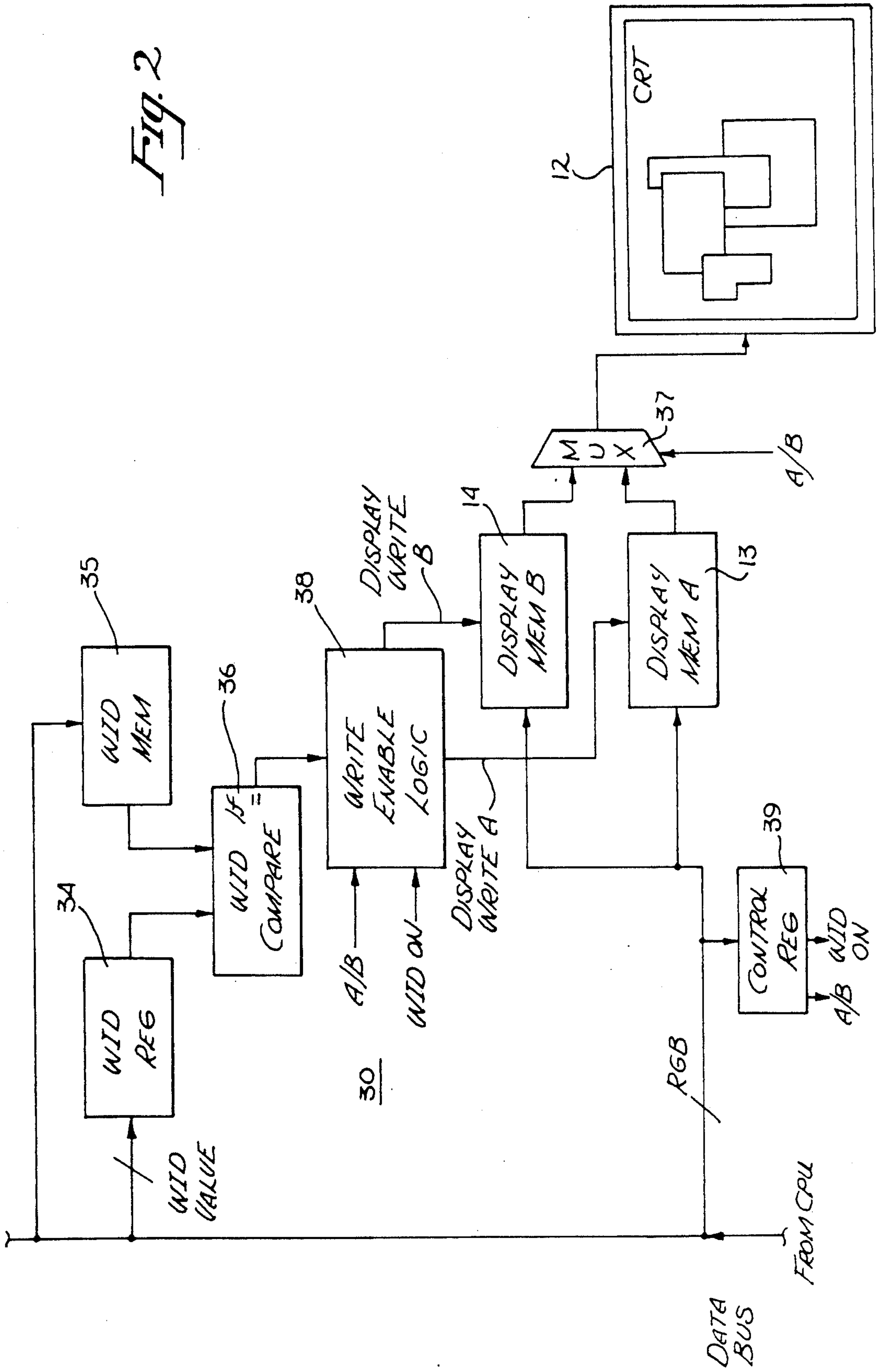
FIG. 2 is a block diagram illustrating an arrangement in accordance with the invention for selecting individual windows to be displayed on a computer output device.

The output system described with respect to FIG. 1 may conveniently be utilized in a computer system which makes full use of multiple windows. For example, FIG. 2 illustrates a window identification output system 30 which may be utilized with or apart from the frame identification arrangement described above. The system 30 is utilized to provide output signals to a cathode ray 12 tuve which signals appear in different windows on the cathode ray tube.

System 30 includes a pair of double-buffered display memories A (13) and B (14), each of which is full screen pixmopped memory. In a preferred embodiment each display memory may include twenty-four bits of storage for each pixel for storing color information. The system 30 also includes a window identification (WID) register 34 which in a preferred embodiment stores four bits of information and a window identification (WID) memory 35 which in the preferred embodiment is a full screen pixmopped memory which stores four bits of information for each pixel. A window identification (WID) comparator 36 receives output signals from the WID register 34 and the WID memory 35. The system 30 also includes a multiplexor 37, write enable logic 38 and a control register 39 for selectively enabling each of the display memories A and B.

In operation, windows are first selected by values provided from the CPU. These values include both a pixel address and a window identification number for each pixel of the window. The window identification number is written to each corresponding pixel of the particular window in the window identification memory 35. When a first window is written to the window identification memory, each pixel within that window carries the window identification number for that window. When a next window which lies in front of the first window is written to the window identification memory, the portions of the second window which overlay the first are written on top of the overlapping pixels of the first and, therefore, automatically cover and clip the first. After all of the windows desired have been written, the window identification memory 35 has stored indications as shown in the display of the CRT 12 in FIG. 2.

when it is desired to write information to a display memory for particular windows (the system for windowing may be used with single display memories as well as double-buffered systems), the information is written into the display memory from the CPU through the data bus. This information includes a pixel address, an RGB color value as discussed above, and a window identification number. The window identification number is stored in the window identification register 34 and compared to the window identification number stored at that pixel in the window identification memory 35. If the window identification number stored in the window identification memory 35 is the same as that in the window identification register 34, the comparator circuit 36 causes the write enable logic 38 to allow the RGB information to be written to the addressed pixel of the selected display memory. If the camparator circuitry determines that the window identification number is not the same as the number stored at that pixel in the window identification memory, then the RGB information is not stored in the display memory. Consequently, only at those addresses of the selected display memory which are within each particular window will a signal for that window be written. The signal written to the display memory is ultimately transferred from the particular display memory via a multiplexor 37 to the cathode ray tube 31 shown in FIG. 2.

A number of additional advantages are realized by the use of the window identification system herein described. For example, without more, the window identification system provides that the information in a particular window is written to the correct area of the display and that portions of any particular window which lie behind other windows are appropriately clipped. Moreover, since the window identification memory is a full screen pixmapped memory, the windows may be of any shape which it is possible to describe rather than simply rectangular windows as in the usual case.

DEPTH INFORMATION

The system shown in FIG. 1 for providing rapid switching between frames of display memory without clearing those display memories may also incorporate apparatus for providing output idicative of the depth of each pixel provided for a particular display on the cathode ray tube. Various systems are known in the prior art for providing depth information, but the usual manner is to provide an indication with each pixel to be written on the display of the position of that pixel along a Z-axis (third dimensional axis).

Figure 3:
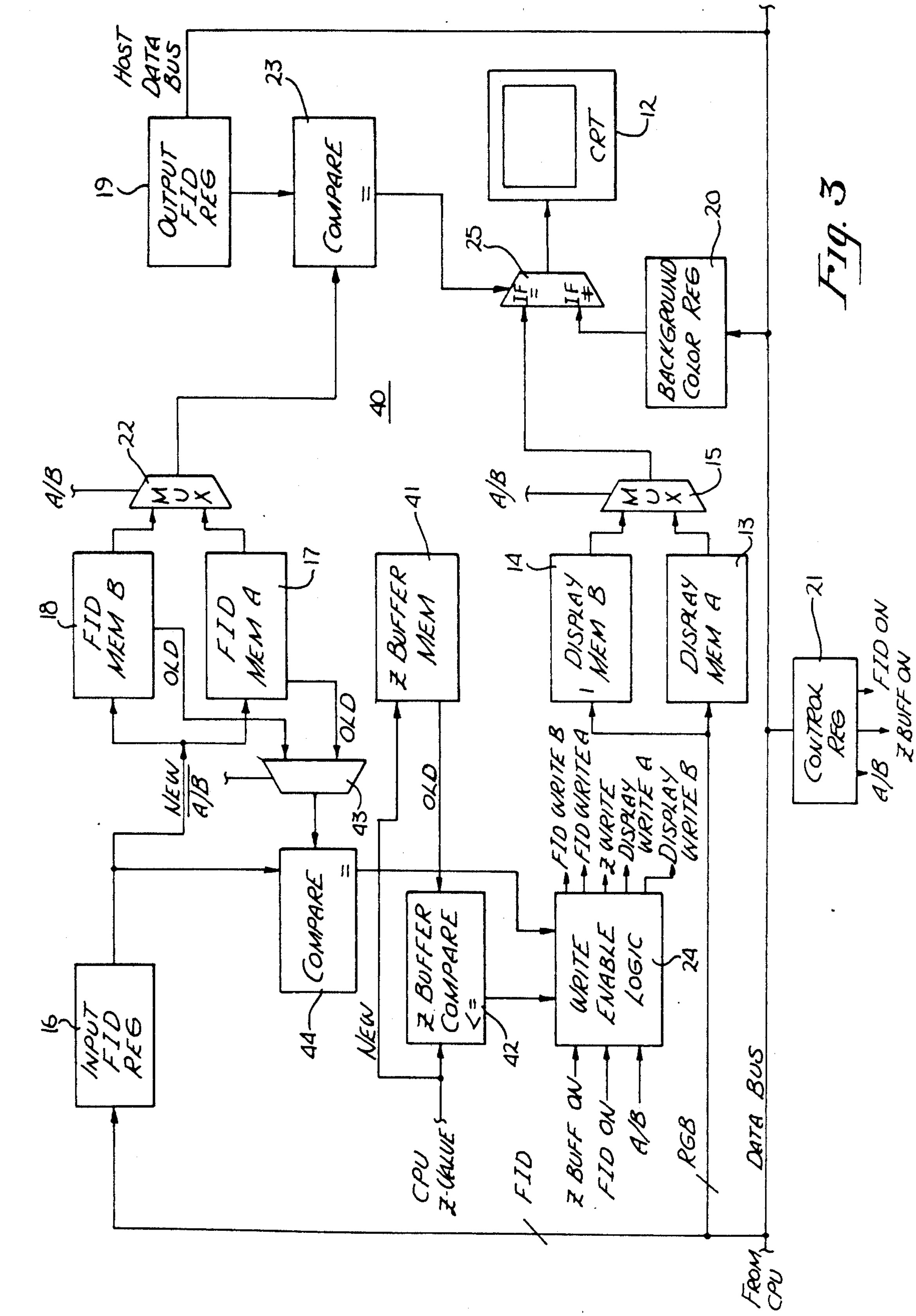
FIG. 3 is a block diagram illustrating an arrangement in accordance with the invention for selecting particular frames involving three-dimensional figures to be displayed on a computer output device.

FIG. 3 illustrates a system 40 for including this information. The system 40 adds to the circuitry illustrated in FIG. 1 a Z buffer memory 41 which stores Z or depth information values; a Z buffer comparator circuit 42 which compares stored Z buffer values to new Z values for each particular pixel, a multiplexor 43 at the output of the FID memories, and a comparator 44. The write enable logic circuit 24 is also ultilized for controlling the writing of information to the FID memories, the Z buffer memory, and the display memories.

As is the case with the display memories, in order to speed system operation, it is desirable to utilize a Z buffer memory 41 which does not require clearing during operation. The normal Z buffer memory is a full screen bitmapped memory which, like the FID memory, the display memories, and the window memory, stores at each pixel address an indication of the particular position that pixel is to take along the Z-axis. In the preferred embodiment of this invention, the Z buffer memory stores twenty-four bits at each pixel; consequently, the process of clearing this memory can substantially slow the system.

In prior art systems, the Z buffer memory is first cleared to the background Z value after each frame. This occurs because the Z buffer memory for each frame stores only the frontmost value for each pixel. Since the background is the deepest indication which may be displayed, the Z buffer memory is normally cleared to background before any frame is written. Unless it is cleared, after the system has been operated for any time, the Z buffer memory contains information from a number of previous frames, and it is necessary to know which pixels are to be utilized and which are to be disregarded.

In order to know if a new pixel should be written to a display memory, it is first necessary to know whether that pixel of the frame identification memory contains information in the frame being written. This determination is made in the system 40 using the imput frame identification register 16 and the particular FID memory 17 or 18 selected by the control register 21 as described above. The incoming FID number is compared with the FID number stored at the indicated pixel in the FID memory; and if that comparison shows that the numbers are equal, then the FID comparator 44 provides an equal output to the write enable logic 24 which indicates that the FID number stored at that pixel is in the frame being written and, therefore, that the pixel has been written at least once for this frame. If the FID numbers are not equal, then this pixel has not been written before in this frame, and the comparator circuit 44 provides a not equal signal to the write enable logic which causes the incoming information to be written to the various memories. In this case, the selected display memory receives the color display signal at the pixel position, the selected FID memory receives the new frame identification number, and the Z value is written to the Z buffer memory.

If the signals from the FID comparator 44 are equal indicating that the pixel has been previously written in this frame, then a Z buffer comparison is necessary to determine whether to write. The Z buffer comparator 42 looks at the Z value at that pixel position in the Z buffer memory and compares it to the new Z value. If the Z buffer comparison shows that the Z number is less than or equal to that which is stored in memory, then the new pixel is in a position at the same plane or in front of the pixel previously written; and the write enable logic is enabled to write the pixel to the appropriate display memory, the FID memory, and the Z buffer memory. A truth table is shown in FIG. 4 which shows the comparison values to be used in the FID comparator 44 and the Z buffer comparator 42 in order to operate the write enable logic so that a pixel may be written to the display memory and the other memories. In the table, for the comparator outputs, a one indicates that the = or ≦= condition is true, a zero means that the condition is not true, while an X indicates that the comparison condition is not used. For the write output, a zero means a write will not occur and a one means a write will occur. As the table shows, if the result of the FID memory comparison is that the FID numbers differ, then a new frame is being written and the write enable circuit is operated whatever the Z buffer comparison may be. On the other hand, if the FID comparison shows the FID numbers to be the same, then the results of the Z buffer comparison control the operation of the write enable circuitry.

Figure 5:
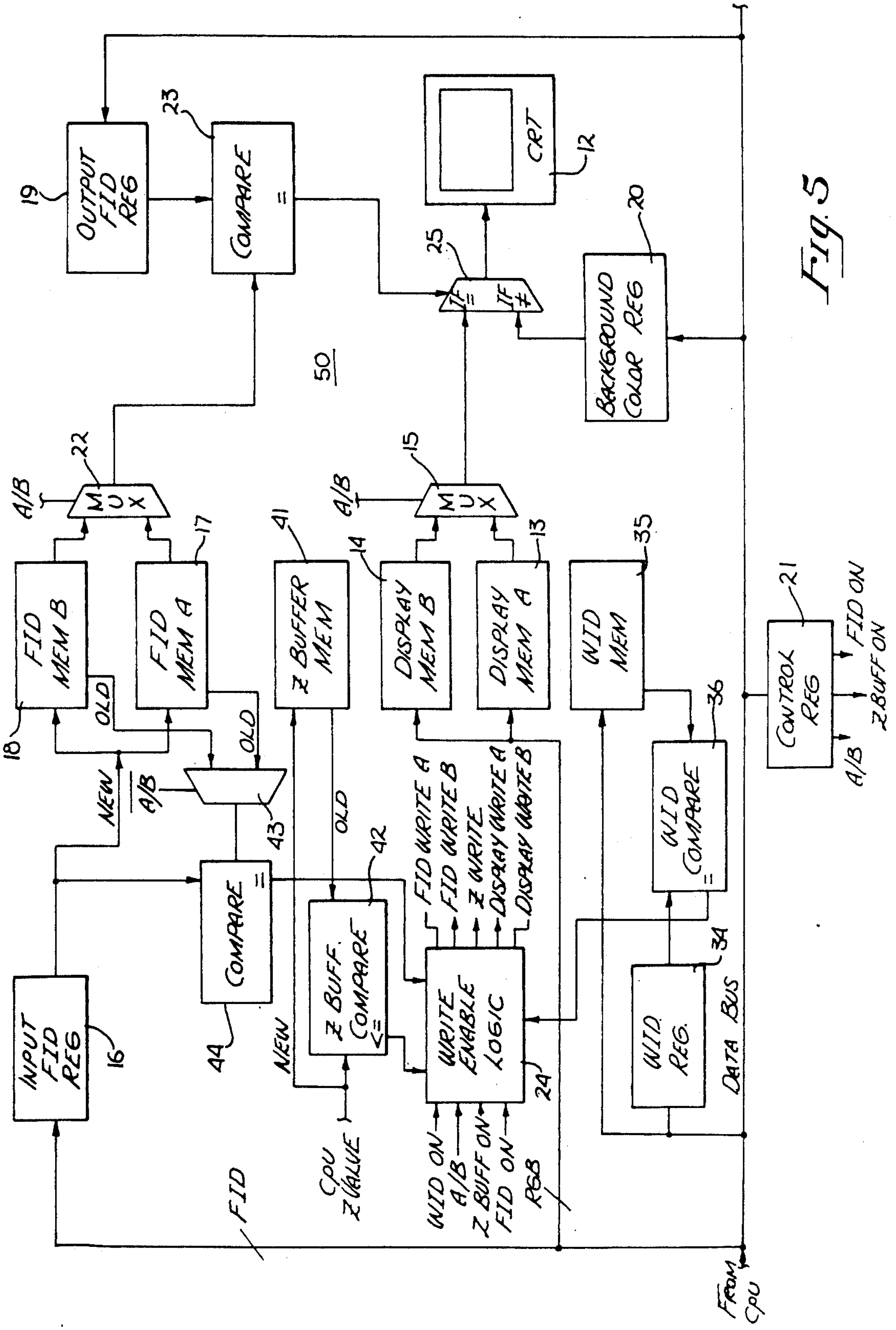
FIG. 5 is a block diagram of a system incorporating arrangements for selecting windows, frames, and depth dimensions of signals to be provided on a computer output device.
Figure 7:
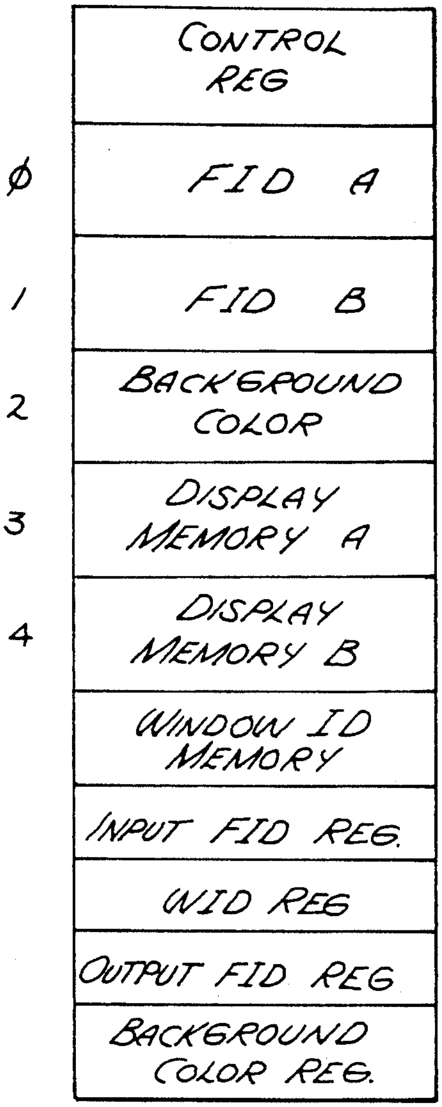
FIG. 7 is a block diagram illustrating the registers and memories which are addressable on the host address bus from the central processing unit in accordance with the present invention.

FIG. 5 illustrates a system 50 which incorporates the elements of the present invention previously described to provide extremely rapid switching between frames to be displayed by a pair of double buffered display memories at an output cathode ray tube. This system includes a control register 21 which receives input signals from the CPU on a data bus and sends signals to enable the window identification circuitry, the Z buffer circuitry and the frame identification circuitry. The control register also selects which of the double buffered display memories 13 and 14 and frame identification memories 17 and 18 are to be selected for any particular operation such as input or output.

The system 50 also includes write enable logic 24 which operates as the central control to cause information to be written to the frame identification memories, the Z buffer memory, and the display memories.

In operation, the system 50 works in the following manner. The control register 21 receives a value which indicates which of the particular elements of circuitry are to be enabled. For example, the particular program may or may not operate with the window comparison circuitry, with the frame identification registers, or with the Z buffer memory circuitry. This is true because the particular program may not have enabled the window operation, may not be operating in the three-dimensional domain, or may not be used to provide animation at the particular moment. The following discussion presumes that all three of the subsystems have been enabled by signals to the control register. The basic operation of this system 50 is to first determine whether data signals are within a particular window, then to determine whether the data signals fall into the particular frame being written, and finally to determine whether the data signals to be stored for that frame lie in front of data signals already stored in that frame.

The first step in any operation is to store the windows to be utilized in the window identification memory. This is accomplished by writing to the window identification memory 35 values from the CPU which are indicative of each of the windows to be utilized.

Thereafter, when it is desired to write a particular pixel to a display memory 13 or 14, a value is stored into the control register 21 to select the appropriate A or B display memory and the appropriate associated frame identification memory 17 or 18. The CPU writes the values of the current window into the WID register 34 and the value of the current frame into the input FID register 16. In the window identification circuitry, the window number in the WID register 34 is compared with the window identification number stored in the window identification memory 35 and if they are equal (that is, the information at that pixel lies in the window), then an enable signal is transferred to the write enable logic 24.

At the input FID comparator 44, the frame number in the input FID register is compared with the frame number stored in the frame identification memory which has been selected by the control register. If the comparison is unequal, then that pixel has not yet been written for this frame and a signal is provided directly to the write enable logic 24 which causes the write enable logic (if it has received an enable signal from the window identification comparison circuit) to write to each of the memories. That is, the write enable logic writes to the particular FID memory which has been selected, to the Z buffer memory, and to the display memory which has been selected by the control register.

If no enable signal has been received from the window identification comparison, then the enabling signal from the FID comparator does not cause the write enable logic to write to any of the memories.

Presuming that the window comparison has provided an enable signal and that the comparison of the signals in the FID register and the selected FID memory shows that the pixel identification is the same, this indicates that this pixel has already been written to at this address for this frame; and it is necessary to make a Z buffer comparison in order to determine whether the present pixel is in front of the pixel already stored. The Z comparison compares the Z value furnished by the CPU with the Z value stored in the Z buffer memory for that pixel. If the Z value furnished by the CPU is equal to or less than that stored in the Z buffer memory, then the new or present pixel is in front of the pixel stored; and a signal is provided to cause the write enable logic 24 to write to the FID memory, the Z buffer memory, and the selected display memory.

FIG. 6 is a truth table illustrating how the results of the the comparisons at the window comparator circuitry, the frame identification comparator, and the Z buffer comparator control the operation of the write enable circuitry of FIG. 5.

The other portions of the circuitry shown in FIG. 5 for system 50 are substantially identical to those previously described and will not therefore be described in detail again. For example, the background color register 20 is utilized to provide background color in the positions in which the pixel to be displayed on the CRT is not a foreground pixel in the selected frame. The output FID register 19 is used, as described above, to determine by comparison of the output frame identification number with the frame identification number stored in the selected FID memory and to enable output from the appropriate display memory or the background color register.

Although the present invention has been described in terms of a preferred embodiment, it will be appreciated that various modifications and alterations might be made by those skilled in the art without departing from the spirit and scope of the invention. The invention should therefore be measured in terms of the claims which follow:

What is claimed is:

1. A computer output system for displaying a plurality of individual frames of information on display means including a display, comprising:

first memory means including a first memory having a plurality of pixel storage positions for storing said frame information at said pixel positions;

second memory means including a second memory having a plurality of pixel positions corresponding to said pixel positions in said first memory for storing one of a plurality of n-bit frame indications at each said pixel position in said second memory, each said n-bit indication indicative of one of said plurality of individual frames of information stored in said first memory;

input means coupled to said first memory means and to said second memory means for inputting into said first memory said frame information and for inputting into said second memory said n-bit frame indications such that said frame information and said n-bit frame indications occupy the same pixel positions in said first and second memories, respectively;

first comparison means coupled to said second memory means for comparing an indication indicative of a particular frame to be displayed on said display with said indications stored at said pixel positions in said second memory means such that if said indications are equal said frame information stored at said corresponding pixel positions in said first memory is displayed on said display; and clearing means coupled to said second memory means for clearing consecutive portions of said second memory after each said particular frame of information has been displayed on said display, said portions cleared comprising at least the pixel positions of said second memory storing the n-bit frame indication of said particular frame of information displayed.

2. The computer output system of claim 1 further including:

third memory means coupled to said input means including a third memory having a plurality of pixel positions corresponding to said pixel positions in said first memory for storing one of a plurality of indications at each said pixel position in said third memory, each said indication indicative of a window to be displayed on said display; and second comparison means coupled to said third memory means for comparing an indication indicative of a particular window to be displayed on said display with said indications stored at said pixel positions in said third memory means;

wherein said input means only inputs said information to be displayed on said display into said first memory means if said indications compared by said second comparison means are equal.

3. The computer output system of claim 1 further including register means coupled to said first comparison means and to said input means for storing background color information, said register means displaying said background information on said display if said indications compared by said first comparison means are not equal.

4. The computer output system of claim 3 wherein said first memory of said first memory means includes a first pair of full screen pixmapped memories, and said second memory of said second memory means includes a second pair of full screen pixmapped memories.

5. The computer output system of claim 4 wherein:

said first memory means further includes first selection means for selecting one of said pixmapped memories in said first pair of pixmapped memories; and said second memory means further includes second selection means for selecting one of said pixmapped memories in said second pair of pixmapped memories.

6. The computer output system of claim 5 wherein said first and second selection means each include a multiplexor.

7. The computer output system of claim 6 wherein said frame information includes an RGB color value.

8. The computer output system of claim 1 wherein said frame information includes an RGB color value.

9. A computer output system for displaying a plurality of individual frames of information on display means including a display such that said information appears three dimensional on said display, comprising:

first memory means including a first memory having a plurality of pixel storage positions for storing said frame information at said pixel positions;

second memory means including a second memory having a plurality of pixel positions corresponding to said pixel positions in said first memory for storing one of a plurality of n-bit frame indications at each said pixel position in said second memory, each said n-bit indication indicative of one of said plurality of individual frames of information stored in said first memory;

third memory means including a third memory having a plurality of pixel positions corresponding to said pixel positions in said first memory for storing depth information at each said pixel position in said third memory;

input means coupled to said first memory means, said second memory means, and said third memory means for conditionally inputting said frame information into said first memory, conditionally inputting said n-bit frame indications into said second memory, and conditionally inputting said depth information into said third memory such that said frame information, said n-bit frame indications, and said depth information occupy the same pixel positions in said first, second, and third memories, respectively;

first comparison means coupled to said second memory means for comparing an indication indicative of a particular frame to be displayed on said display with said indications stored at said pixel positions in said second memory means such that if said indications are not equal said input means stores said frame information at said corresponding pixel positions in said first memory, said indications at said pixel positions in said second memory, and said depth information at said pixel positions in said third memory; and second comparison means coupled to said third memory means and to said input means for comparing said depth information stored in said third memory with said depth information input by said input means when said indications compared by said first comparison means are equal such that if said stored depth information has a value that is greater than or equal to said depth information input by said input means then said input means stores said frame information at said corresponding pixel positions in said first memory, said indications at said pixel positions in said second memory, and said depth information at said pixel positions in said third memory.

10. The computer output display system of claim 9 further including third comparison means coupled to said second memory means and to said input means for comparing an indication of a particular frame to be displayed on said display with said indications stored at said pixel positions in said second memory such that if said indications are equal said frame information and said depth information stored at said corresponding pixel positions in said first and second memory means, respectively, are displayed on said display.

11. The computer output display system of claim 10 further including register means coupled to said third comparison means and said input means for storing background color information, said register means displaying on said display said background information if said indications compared by said third comparison means are not equal.

12. The computer output system of claim 11 wherein said first memory of said first memory means includes a first pair of full screen pixmapped memories, and said second memory of said second memory means includes a second pair of full screen bitmapped memories.

13. The computer output system of claim 12 wherein:

said first memory means further includes first selection means for selecting one of said pixmapped memories in said first pair of pixmapped memories; and said second memory means further includes second selection means for selecting one of said pixmapped memories in said second pair of pixmapped memories.

14. The computer output system of claim 13 wherein said first and second selection means each include a multiplexor.

15. The computer output system of claim 14 wherein said frame information includes an RGB color value.

16. The computer output system of claim 9 wherein said frame information includes an RGB color value.

17. A computer output system for displaying a plurality of individual frames of information such that said information can optionally be displayed inside windows, and three dimensionally on display means including a display, said output system comprising:

first memory means including a first memory having a plurality of pixel storage positions for storing said frame information at said pixel positions;

second memory means including a second memory having a plurality of pixel positions corresponding to said pixel positions in said first memory for storing one of a plurality of n-bit frame indications at each said pixel position in said second memory, each said n-bit indication indicative of one of said plurality of individual frames of information stored in said first memory;

third memory means including a third memory having a plurality of pixel positions corresponding to said pixel positions in said first memory for storing one of a plurality of said n-bit indications at each said pixel position in said third memory, each said indication indicative of a window to be displayed on said display;

fourth memory means including a fourth memory having a plurality of pixel positions corresponding to said pixel positions in said first memory for storing depth information at each said pixel position in said fourth memory;

input means coupled to said first memory means, said second memory means, said third memory means, and said fourth memory means for conditionally inputting said frame information into said first memory, conditionally inputting said n-bit frame indications into said second memory, inputting said window information into said third memory, and conditionally inputting said depth information into said fourth memory such that for each particular frame said frame information, said n-bit frame indication, said window information, and said depth information occupy the same pixel positions in said first, second, third, and fourth memories, respectively;

first comparison means coupled to said third memory means for comparing an indication indicative of a particular window to be displayed on said display with said indications stored at said pixel positions in said third memory means;

second comparison means coupled to said second memory means for comparing said indication indicative of said particular frame to be displayed on said display with said indications stored at said pixel positions in said second memory means such that if said indications are not equal and said indications compared by said first comparison means are equal then said frame information is input into said first memory, said n-bit indications are input into said second memory, and said depth information is input into said fourth memory; and third comparison means coupled to said fourth memory means and to said input means for comparing said depth information stored in said fourth memory with said depth information input by said input means when said indications compared by said first and second comparison means are both equal such that if said stored depth information has a value greater than or equal to said depth information input by said input means then said input means stores said frame information at said corresponding pixel positions in said first memory, said indications at said corresponding pixel positions in said second memory, and said depth information at said corresponding pixel positions in said fourth memory.

18. The computer output system of claim 17 further including fourth comparison means coupled to said second memory means for comparing said indication indicative of a particular frame to be displayed on said display with said indications stored at said pixel positions in said second memory means such that if said indications are equal said frame information stored at said corresponding pixel positions in said first memory is displayed on said display.

19. The computer output system of claim 18 further including register means coupled to said fourth comparison means and said input means for storing background color information, said register means displaying said background information on said display if said indications compared by said fourth comparison means are not equal.

20. The computer output system of claim 19, further including clearing means coupled to said second memory means are clearing means coupled to said second memory means for clearing consecutive portion of said second memory after each said particular frame of information has been displayed on said display, said portions cleared comprising at least the pixel positions of said second memory storing the n-bit frame indication of said particular frame of information displayed.

21. The computer output system of claim 20 further including control means for separately enabling one or more of said second memory means, said third memory means, and said fourth memory means.

22. The computer output system of claim 21 wherein said frame information includes an RGB color value.

23. The computer output system of claim 21 wherein said first memory of said first memory means includes a first pair of full screen pixmapped memories and said second memory of said second memory means includes a second pair of full screen pixmapped memories.

24. The computer output system of claim 23 wherein:

said first memory means further includes first selection means for selecting one of said pixmapped memories in said first pair of pixmapped memories; and said second memory means further includes second selection means for selecting one of said pixmapped memories in said second pair of pixmapped memories.

25. The computer output system of claim 24 wherein said first and second selection means each include a multiplexor.

26. The computer output system of claim 25 wherein said frame information includes an RGB color value.

* * * * *